(12) United States Patent
Saquib

(10) Patent No.: US 11,410,425 B2
(45) Date of Patent: Aug. 9, 2022

(54) PREDICTIVE TARGET TRACKING USING TRAFFICABILITY MAPS

(71) Applicant: Goodrich Corporation, Charlotte, NC (US)

(72) Inventor: Suhail Shabbir Saquib, Shrewsbury, MA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/111,735

(22) Filed: Dec. 4, 2020

(65) Prior Publication Data

US 2022/0129678 A1   Apr. 28, 2022

Related U.S. Application Data

(60) Provisional application No. 63/105,632, filed on Oct. 26, 2020.

(51) Int. Cl.
*G06K 9/00* (2022.01)
*G06V 20/40* (2022.01)
*G06K 9/62* (2022.01)
*G06V 10/25* (2022.01)
*G06V 20/13* (2022.01)

(52) U.S. Cl.
CPC .............. *G06V 20/46* (2022.01); *G06K 9/623* (2013.01); *G06V 10/25* (2022.01); *G06V 20/13* (2022.01); *G06V 20/49* (2022.01)

(58) Field of Classification Search
CPC .............. G06K 9/00744; G06K 9/0063; G06K 9/00765; G06K 9/3233; G06K 9/623
See application file for complete search history.

(56) References Cited

U.S. PATENT DOCUMENTS

| | | | |
|---|---|---|---|
| 8,229,163 B2 | 7/2012 | Coleman et al. | |
| 10,295,653 B2 | 5/2019 | Burton et al. | |
| 2009/0087029 A1* | 4/2009 | Coleman | G06K 9/00208 382/103 |
| 2012/0176494 A1 | 7/2012 | Kamon et al. | |
| 2018/0281815 A1* | 10/2018 | Stentz | G08G 1/0129 |
| 2020/0293057 A1 | 9/2020 | Reid et al. | |

FOREIGN PATENT DOCUMENTS

EP    3534297 A2    9/2019

OTHER PUBLICATIONS

Extended European Search Report dated Mar. 7, 2022, issued during the prosecution of European Patent Application No. EP 21204803.7.

* cited by examiner

*Primary Examiner* — Dhaval V Patel
(74) *Attorney, Agent, or Firm* — Locke Lord LLP; Joshua L. Jones; Scott D. Wofsy

(57) ABSTRACT

A method includes receiving a query from a user requesting a prediction on future location of a target at a time t>0, receiving a trafficability map wherein the target is located in the trafficability map at an initial time t=0, receiving information about the target including uncertainty on speed of the target, modeling motion of the target using information from the trafficability map including terrain and target mobility on different terrain types to locations on the trafficability map, and answering the query from the user based on output from modeling motion of the target.

20 Claims, 15 Drawing Sheets

PREDICTIVE TARGET TRACKING USING TRAFFICABILITY MAPS

CROSS REFERENCE TO RELATED APPLICATIONS

This application claims the benefit of priority to U.S. Provisional Patent Application Ser. No. 63/105,632, filed on Oct. 26, 2020, the disclosure of which is incorporated herein by reference in its entirety.

BACKGROUND

1. Field

The present disclosure relates to tracking, and more particularly, to predictive target tracking.

2. Description of Related Art

Historically, moving targets can be tracked using a Kalman filter, which uses a series of measurements observed over time, containing statistical noise and other inaccuracies, and a model of the short-term dynamics of the target to produce estimates of hidden and observed variables that tend to be more accurate than those based on a single measurement alone. This is done in a rigorous fashion by estimating the joint probability distribution over the variables of interest at each time instance. To make the computations at each time step efficient and recursive, it is assumed that the observation and model prediction noise is Gaussian.

When using a Kalman filter, long gaps in data collection, usually considered more than a few minutes, can cause issues in a user's ability to know where to look when data collection resumes and they seek to re-acquire a target's location. This is because the model employed for target dynamics is only accurate for relatively short periods of time and in the absence of additional observations, the model quickly loses its accuracy. The prediction uncertainty of a Kalman filter can therefore quickly grow over time, making its deployment essentially useless for long-term prediction of target location.

A predictive target tracking application typically needs to be able to answer user queries such as:
1. What time frame will the target arrive at a particular location?
2. Where am I likely to find the target after a certain elapsed time?
3. What is the probability of finding the target at a particular location at a particular time?

The conventional techniques for predictive target tracking have been considered satisfactory for their intended purpose. However, there is an ever present need for improved systems and methods for predictive target tracking when a long time has elapsed since the last observation. This disclosure provides a solution for this need.

SUMMARY

A method includes receiving a query from a user requesting a prediction on future location of a target at a time t>0, receiving a trafficability map wherein the target is located in the trafficability map at an initial time t=0, and receiving information about the target including uncertainty on speed of the target. The method includes modeling motion of the target using information from the trafficability map including terrain and target mobility on different terrain types to locations on the trafficability map and answering the query from the user based on output from modeling motion of the target.

The modeling motion can include using a Monte Carlo modeling scheme wherein a plurality of sample targets can be introduced on the trafficability map each endowed with motion characteristics of the target and propagated over time with different speeds and direction of travel drawn from uncertainty distributions based on terrain and target characteristics. Answering the query from the user can include answering based on the distribution of the plurality of sample targets.

The modeling motion of the target can include computing a minimum arrival time based on terrain and target motion characteristics on different terrain types using an iterative scheme where approximate arrival times of the target can be progressively refined to approach a final predicted minimum arrival time. The final predicted minimum arrival time and the uncertainty on speed of the target can be used to compute upper and lower bounds for a respective arrival time at each location on the trafficability map. The upper bound and lower bound on the arrival time can then be used to answer the query from the user. Computing upper and lower bounds can include letting $s_v$, where $0 \leq s_v \leq 1$, denote a model scale factor applied to maximum speed of the target assuming all different speed variations over time average out and manifest as a simple scaling of maximum vehicle speed on each terrain type, modeling uncertainty by making $s_v$ a random variable and establishing upper and lower bounds on $s_v$ from a user supplied confidence interval, and computing the bounds on the arrival time using the bounds on $s_v$.

The bounds on arrival time can be computed as $[t_r^m/s_{vu}, t_r^m/s_{vl}]$, where $s_{vl}$, $s_{vu}$, denote user supplied bounds on $s_v$ and $t_r^m$ denotes the computed minimum arrival time for each cell location r. The query can include a request for at least one of a range of arrival times at a given cell location on the trafficability map, a target location at different times, an area in which the target can be found at a specified time, and/or probability of finding the target in a set of cell locations at a specified time.

The method can include receiving location and uncertainty of location for a detected target at the time t>0, wherein modeling motion of the tracked target includes generating a probability mass of location of the tracked target at the t>0, determining from the location and uncertainty of location for the detected target and from the probability mass of the tracked target whether the tracked target corresponds to the detected target at the time t>0, and reinitializing the trafficability map if the tracked target corresponds to the detected target to continue modeling motion of the tracked target from the location of the at detected target, including resetting the initial time to the time t>0. The method can include informing the user that the detected target is the same as the tracked target.

The method can include receiving a new detection including a location uncertainty map of the new detection at a time $t_1 > 0$, wherein modeling motion includes predicting a location uncertainty map of the target location at the time $t_1$. The method can include computing a fused probability mass of the location uncertainty map of the target and the location uncertainty map of the new detection. The method can include determining the new detection is a new target if the fused probability mass is zero and determining the new detection is the target if the fused probability mass is non-zero.

The method can include receiving initial direction of travel of the target at the initial time t=0. The method can include generating a region of interest (ROI) based on the initial direction of travel, wherein modeling motion of the target is performed only for the ROI on the assumption that the target cannot reach points outside the ROI. The modeling motion can include excluding probability masses located in an opposite direction from the initial direction of travel of the target when answering query.

The method can include receiving a region of interest (ROI) within the trafficability map, wherein modeling motion of the target is performed only for the ROI on the assumption that the target cannot reach points outside the ROI. Computing minimum arrival time can also be performed for all locations on the trafficability map, and wherein modeling motion of the target can be performed for all locations on the trafficability map. Receiving information about the target can include receiving location of the target, speed of the target, direction of travel of the target, and a label indicative of what the target is classified as.

A system includes machine readable instructions for performing any of the methods described above. A processor is operatively connected to the machine readable instructions and is configured to perform any of the methods described above. An input device is operatively connected to the processor for inputting the user query to the processor. An output device is operatively connected to the processor for outputting an answer to the query to the user.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
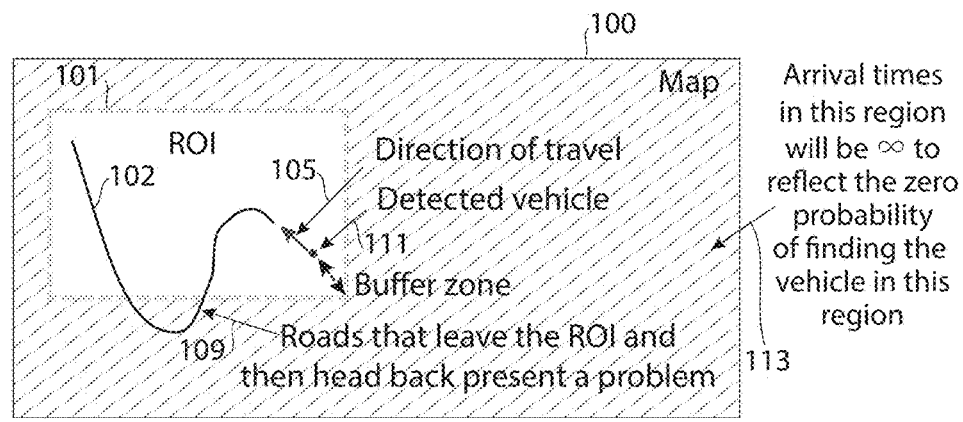
FIG. 1 is a diagrammatic view of a trafficability map shown with a region of interest (ROI) for modeling target motion chosen based on the target's direction of travel.

Reference will now be made to the drawings wherein like reference numerals identify similar structural features or aspects of the subject disclosure. For purposes of explanation and illustration, and not limitation, a partial view of an embodiment of a trafficability map for use with a method in accordance with the disclosure is shown in FIG. 1, and is designated generally by reference character 100. Other embodiments of systems in accordance with the disclosure, or aspects thereof, are provided in FIGS. 2-16, as will be described. The systems and methods described herein can be used in predictive target tracking using trafficability maps. This can be used, for example, to predictively track surface vehicles accounting for the surrounding terrain and concomitant difficulty in reaching different points on the trafficability map.

Figure 5:
FIG. 5 is a table listing example terrain types encoded by a trafficability map and example target speeds on these terrain types.

As discussed earlier, the Kalman filtering applications tend to suffer in the long-term prediction due to limited knowledge of the vehicle dynamics in the absence of observations. The system and methods herein overcome these drawbacks by supplementing the knowledge of vehicle dynamics by a priori knowledge of the existing terrain and known vehicle mobility on these different types. Information such as terrain types can be encoded in a trafficability map (an example is shown in FIG. 5). Additional information about how a particular target traverses these terrain types can be stored in a look-up table (example shown in FIG. 6). The combination of a trafficability map and the target dynamics on different terrain types provide all the a priori information that enables accurate prediction of the target location over relatively long time frames.

A first approach employs the Monte Carlo method and involves modeling the distribution of target location using n sample vehicles. Each of the n sample vehicles are endowed with the vehicle dynamics expected for the target being modeled. The simulation starts with all the vehicles at the known location of the target or a distribution of locations consistent with the uncertainty in the location of the vehicle. The simulation proceeds by propagating the n sample vehicles at each time step based on the individual vehicles dynamics drawn form a distribution of possible dynamics valid for the terrain that the sample is on. Over time, the n sample vehicles spread out over the map mimicking n random instances of the true target. The user queries of where the target is located after a certain elapsed time can then be answered by reconstructing the probability distribution encoded by the n vehicles as a function of time.

In practice, this first approach has some caveats. Sample vehicles are unexpectedly tethered based on local features of the map, and a large n is required to get an accurate description of the underlying distribution. This Monte Carlo approach also requires many heuristics for functionality, with no direct way to answer the query about time taken for a target to arrive at a particular location.

A second approach involves the shortest travel time. This second approach assumes that a target is generally seeking to minimize travel times to its destination. This approach allows for the model to compute shortest travel paths in terms of time to all points in a region of interest (ROI) in the trafficability map from the starting target location. However, unlike the Monte Carlo approach, where uncertainty in vehicle speed history is inherently modeled, uncertainty modeling in shortest travel time approach is more difficult. In shortest travel time approach, vehicle speed history is embedded in the computed minimum arrival times for each cell in the trafficability map making it a complex function of terrain and speed history of the vehicle. A Monte Carlo approach that recomputes arrival times for randomly drawn speed histories is a possible solution to model the uncertainty in the arrival times. However, an arbitrary variation in speed history will require a full recomputation of the minimum arrival time. This is a very computationally intensive process, with uncertain benefits given that no information will typically be available on the speed distribution of the vehicle when it is not being observed.

Therefore, a solution is proposed to these issues with uncertainty modeling in the shortest travel time approach. First, assume all the different speed variations over time average out, and manifest as a simple scaling of the maximum vehicle speeds on each terrain type. For this analysis, let $s_v$, $0 \le s_v \le 1$, denote the model scale factor applied to maximum speeds. As a result, uncertainty is now modeled by making $s_v$ a random variable. Under this scalar model, no recomputation of minimum arrival times is necessary. The minimum arrival times are simply scaled up by $s_v$ for a slower moving vehicle, and a x percent variation in speed simply manifests as a x percent variation in arrival times.

The model is comprised of the primary method for reducing computation to better permit uncertainty modeling in the shortest travel time approach. As the minimum travel time to any cell requires an exhaustive search of all paths to the cell from the initial target location, which quickly becomes intractable as more time elapses, the method establishes a recursion to render minimum travel time to any cell a function of minimum arrival time to its neighbors. To do so, the following expression is employed $$t_s^m = \min\{t_r^m + \Delta t_{s,r}, r \in N_s\}, \qquad (1)$$

where $t_s^m$ denotes the minimum travel time to cell s, $N_s$ denotes the set of indices of all neighbors of cell s, and $\Delta t_{s,r}$ denotes the travel time between cells s and r. The $\min\{\cdot\}$ operator takes the minimum of all the elements of a set. The travel time between adjacent cells is given as $$\Delta t_{s,r} = \frac{d_{s,r}}{v_{s,r}},$$

where $d_{s,r}$ denotes the distance between cells s and r and $v_{s,r}$ denotes the average speed between cells s and r, which is dependent on the local terrain.

The recursion given by Eq. (1) can be solved by an iterative method where we start with an initial estimate of the minimum arrival time and progressively refine it at each iteration to approach the true minimum arrival time for each cell. This approach is reminiscent of a dynamic programming solution to solving the recursion of Eq. (1).

Let i denote the iteration index and let $t_s^{(i)}$ denote the estimate of the minimum arrival time at iteration i for cell location s. The estimated minimum arrival times are initialized at the start of the iterative process (i=0) as follows:

$$t_s^{(0)} = \begin{cases} 0, & s = s_T \\ \inf & s \ne s_T \end{cases},$$

where $s_T$ denotes cell index of the location of the target at initial time t=0. At each subsequent iteration, the estimated minimum arrival time is updated as follows:

$$t_s^{(i+1)} = \min\{t_r^{(i)} + \Delta t_{s,r}, r \in N_s\}, \text{for all } s. \qquad (2)$$

The iterative process continues until the estimated minimum arrival time for all cell locations does not change from one iteration to the next, i.e., the iterative process terminates for a value of $i = i_c$ such that $$t_s^{(i_c+1)} = t_s^{(i_c)}, \text{for all } s.$$

At convergence, the iterative estimate of the minimum arrival time is the true minimum arrival time $$t_s^m = t_s^{(i_c)}.$$

Additional strategies are employed for reducing computation within the model. The iterative solution requires updating all cells in the trafficability map until convergence. However, most cell are left untouched in any single iteration, resulting in a lot of wasted computation. This is clearly seen in the iterative process, where at the start of the process the minimum arrival time is zero for only one cell $s_T$ and all other cells have their values set to infinity. At the first iteration, only neighbors of the cell $s_T$ will reduce their time from infinity and the rest of the cells will remain at infinity. The iterative process outlined above does not know this and will visit all locations to perform the update of Eq. (2) with no change to the value of the underlying cell.

One way to reduce computation is to remember which cells are updated in each iteration, and only update the neighbors of these cells in the next iteration. This bookkeeping tactic automatically keeps track of the moving wavefront of the propagating changes and only updates cells when necessary, reducing computation drastically.

An even more efficient method is to keep a sorted list of the cells with their estimated minimum arrival times, with cells not yet visited having their arrival times set to infinity. This sorted list is regarded as a queue with the head of the queue containing the cell having the least estimated minimum arrival time. At each iteration, the cell at the head of the queue is removed (popped) from the queue and the estimated minimum arrival time of all its neighbors are updated. The neighbors will update their values if there is a shorter path by going through the cell at the head of the queue and their estimated minimum arrival time will drop. The neighbors that updated their values are then rearranged in the queue to keep it sorted at all times. The popped cell is discarded and never visited again as it has already achieved its minimum arrival time. The process continues by popping the cell at the head of the sorted queue at the next iteration and terminates when there are no more cells left in the queue. In this manner, all cells in the trafficability map are visited just once. Though the method requires an additional overhead of maintaining a dynamic sorted list, it still is the most efficient way of computing the minimum arrival time. This is essentially Dijkstra's algorithm for computing the shortest path between nodes of a graph but applied here to compute minimum arrival times instead of distances.

For computing uncertainty bounds on the minimum arrival time and answering typical user queries regarding the location and uncertainty of finding the target at any time t, the user supplies a value for model scale factor $s_v$ along with the expected bounds on the model scale factor $[s_{vl}, s_{vu}]$. Given these values and the minimum arrival time for each cell, the range of times that the target reaches a particular cell s is given as $$[t_r^m/s_{vu}, t_r^m/s_{vl}].$$

Given this range of arrival times, the user query of where the target may be located at any time t is given by the set of cell locations $A_t$ computed as $$A_t = \{r: s_{vl}t \leq t_r^m \leq s_{vu}t\}.$$

Note that as a matter of convention, we will use the bold font to denote a set of cell locations. The set $A_t$ gives the region of the trafficability map where the probability of finding the target is non-zero. This set can be used for answering other user queries regarding finding the target at a particular location and time. Let P(L|t) denote the probability of finding the target at locations in set L at time t. Then $$P(L \mid t) = \frac{|L \cap A_t|}{|A_t|},$$

where |•| denotes cardinality of the set.

For visualization of the how the target travels from its starting position over time, a contour plot of the arrival time in each cell r, $t_r^m/s_v$, can be made. The contours show the wavefront of the target as it propagates through the trafficability map as a function of time.

Additionally, the method looks to leverage the known destination of an observed vehicle. The previous treatment assumed a vehicle is observed whose destination is unknown and is equally likely to go in any direction. However, if the destination of the vehicle is known, then the probability surface can be skewed in the direction of the destination. The dynamic programming solution remembers the source cell that resulted in the minimum time for each cell, and this information can be used to trace the shortest route from the destination to the source going backwards. Then, the probabilities for all cells outside this path is set to zero for area type queries at any time instance.

Leveraging direction of travel can also be utilized for short-term predictions. The previous treatment assumed that only the position of a vehicle is detected by the sensor. However, if the velocity of a vehicle is detected as well, this value can be used to alter the prediction maps in the short to medium term, assuming the vehicle will maintain its general direction of travel and not do an about-turn. The location and area queries will reflect this bias, as anything outside of the region of interest (ROI) for minimum arrival times is not accessible by the vehicle. The method in this scenario computes the minimum arrival time only in the ROI saving computation in the process. FIG. 1 depicts a visual representation of the ROI as applied to a trafficability map. ROI 101 is shown with an additional buffer zone, and is set up to reflect the direction of travel 105 of a detected vehicle 111. The buffer zone is employed to reduce the likelihood of the target leaving the ROI as it traverses the trafficability map. Outside of ROI 101, arrival times across the map 100, depicted generally at 113, will be infinity to reflect the zero probability of finding the detected vehicle 111 in this region 113.

Although the method saves computation by computing the minimum arrival times only in the ROI, it can suffer from accuracy issues and may not find the true minimum arrival times at all the cell locations within the ROI. For example, the sample road 102 may leave the ROI 101, depicted at 109, and then reenter the ROI. Since any area outside the ROI is inaccessible to the vehicle, the minimum arrival times in the portions of the road 102 after it reenters the ROI will be inaccurate and generally higher than what could be achieved had the vehicle been allowed to exit the ROI.

Figure 2:
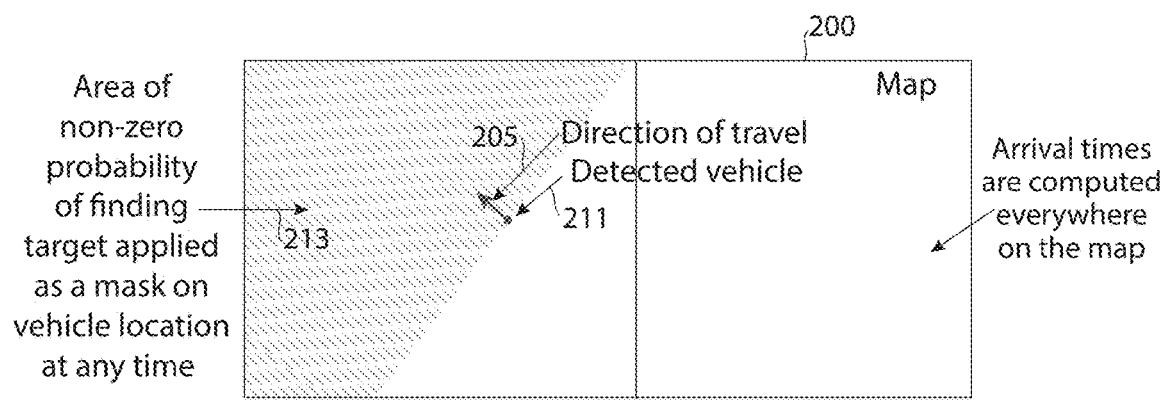
FIG. 2 shows how the accuracy of the prediction can be improved over FIG. 1 by applying a mask based on the target's direction of travel to the area of non-zero probability predicted by the tracker.

A restrictive ROI can therefore yield sub-optimal results. To overcome this shortcoming, it is also contemplated that the travel times can be computed on the entire map, but possible locations of a vehicle are only considered in the general direction of travel by the application of mask based on the direction of travel. This process increases computation, but helps eliminate the risk of an incorrect result. FIG. 2 depicts a visual representation of a mask as applied to a trafficability map. The direction of travel 205 of the detected vehicle 211 is shown within map 200. The minimum arrival times are computed everywhere on map 200. However, when user queries pertaining to probability of finding the target at a given time t are answered, a mask is applied to zero out the probability everywhere except for the shaded region 213, where the mask has been chosen to reflect the direction of travel and the assumption that it is unlikely to find the target in a general direction opposite to the current direction of travel.

Figure 3:
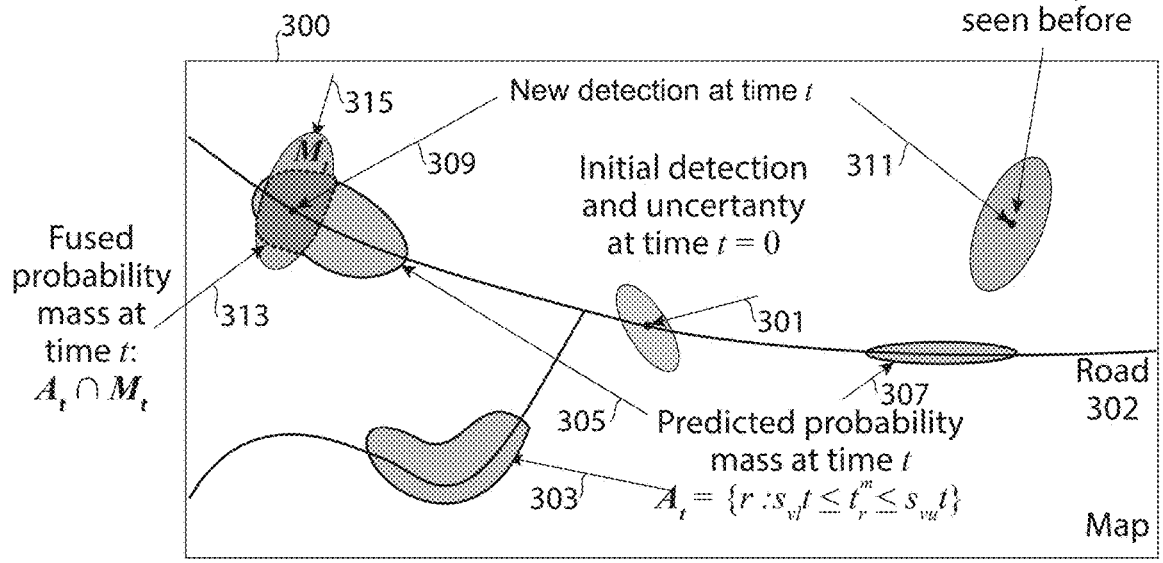
FIG. 3 is a diagrammatic view of the trafficability map, showing probability masses of predicted target location at a time instance when new detections are received.

FIG. 3 depicts a trafficability map utilizing predictive tracking for geolocation fusion of new detections. The figure shows how predictive tracking can be utilized to determine whether a new detection is the same target that is being currently tracked by the tracker or a different target altogether. If the new detection is determined to be the same target, then the predictive tracker can update the location of the target being tracked to the location given by the detection at the time the detection was made. The uncertainty in the location of the target is also reduced to reflect the uncertainty of the detection, which can be significantly lower than the uncertainty produced by the predictive tracker.

The predictive tracker is initialized on map 300 with an initial detection with target location 301 and uncertainty at time t=0 as shown along road 302. Subsequently, two new detections, 309 and 311, of the same target type are received at time t>0 and the target tracker is tasked with determining if any of these new detections correspond to the target that is being tracked by the tracker. Employing previously outlined techniques, the tracker comes up with a prediction of the probability mass of the target that is being tracked at time t. Given the layout of the road in this example scenario, the tracker predicts that the target could likely be in the regions shown as 303, 305, and 307. These regions are found by first computing the minimum arrival times $t^m$ at all map locations and then computing the set of cell locations $A_t = \{r: s_{vl}t \leq t_r^m \leq s_{vu}t\}$. The set $A_t$ is then used to compute a fused probability mass with respect to the two detections 309 and 311. The location uncertainty given by detection 309 denoted by $M_t$ 315 has a non-null overlap with the predicted uncertainty given by $A_t$ yielding a fused probability mass $A_t \cap M_t$ shown as 313. Consequently, the target corresponding to detection 309 is classified as the same target that is being tracked by the tracker. On the other hand, the uncertainty of target corresponding to detection 311 has no overlap with $A_t$ and is therefore deemed to be a new target that is not likely to be the target that is being tracked. Given this new information, the tracker is reinitialized with the location of the target given by detection 309 at detection time t. The future time t now becomes the initial time for the target tracker and the same process repeats when new detections come in at a later time.

Figure 4:
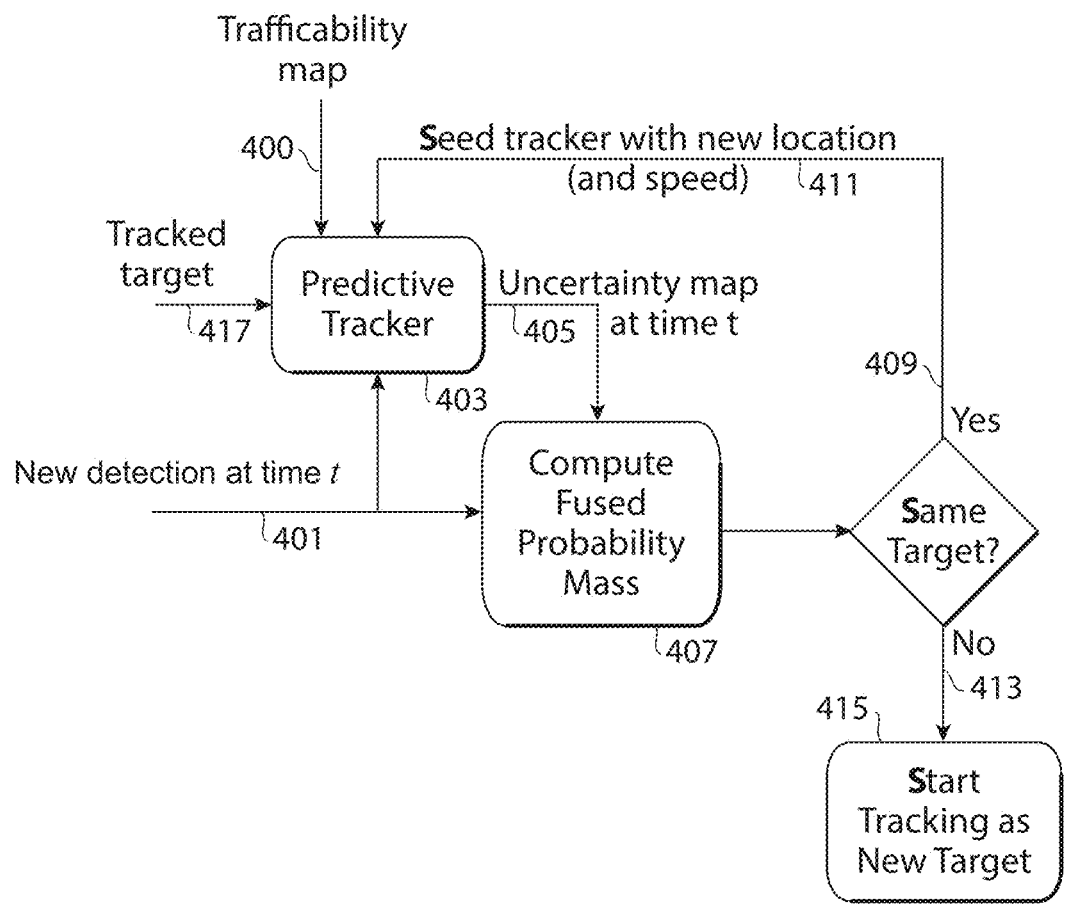
FIG. 4 is a schematic data flow for performing geoposition fusion to determine if a new target detection is the same as the target being tracked or a different target.

FIG. 4 depicts data flow for geoposition fusion within a system when determining whether a newly detected target is an entirely new target or the same target as previously detected. A new detection comes in at time t shown as 401. The time t is supplied to the predictive tracker 403, which is tracking a previously detected target 417 on a trafficability map 400 that encodes the mobility of this target on the different terrain types in the area. The predictive tracker 403 does the motion modeling for the tracked target 417 starting from initial time t=0, to the current time t>0 of the new detection. The motion modeling is then used to produce an uncertainty map of the tracked target at time t shown as 405. The uncertainty map 405 and the location uncertainty of the new detection 401 are used to compute the fused probability mass of these two uncertainties as shown in 407. If the fused probability mass is zero, i.e., the two uncertainties 401 and 405 do not overlap as seen in the example detection 311 of FIG. 3, the target is determined (decision 413) to be a new target not seen previously. The location and uncertainty of the new detection can then be used to initialize a new tracker 415 that starts tracking this target.

If the fused probability mass is non-zero, i.e., the two uncertainties 401 and 405 do overlap as seen in the example detection 309 of FIG. 3, the new detection is determined (decision 409) to be the same as the target that is being tracked by the tracker. In this scenario, the location of the new target is sent to the predictive tracker with instructions 411 to reinitialize the tracker with the new position as the initial location of the target at time t. The process then repeats when new detections are received. Note that each detection is tested against all the different targets that are being tracked and FIG. 4 just shows a single instance of the tracker.

Figure 6:
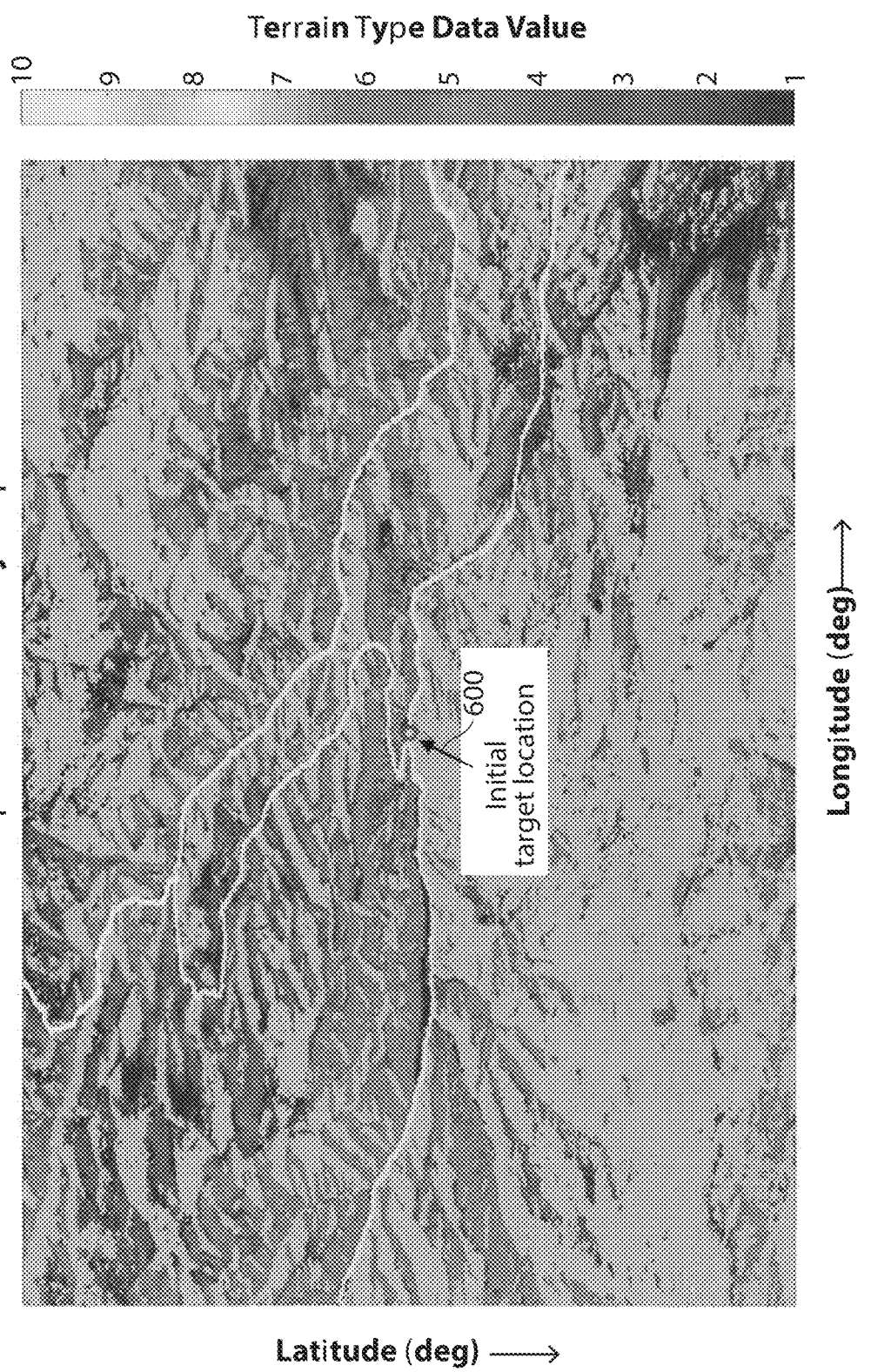
FIG. 6 is an example trafficability map showing the different terrain types using a color-coded scale.

FIG. 5 depicts a table of example terrain types encoded in a trafficability map and vehicle speeds on those terrain types. Data values 501 and target speed 503 are assigned to corresponding descriptions of environment terrain, with descriptions being assigned data values of 0-10. Those skilled in the art having had the benefit of this disclosure will readily appreciate that these are just example descriptions of possible terrain types with corresponding target speeds and should be in no way considered an exhaustive list or constraining the application in any way. FIG. 6 depicts an example trafficability map with these data values displayed with color codes using the scale shown to the right of the map to visualize the different terrain types in an example area. The predictive tracker is given the initial target location 600 at initial time t=0 on the trafficability map. The results shown in the subsequent FIGS. 7-15 use this example trafficability map along with the terrain-to-speed mapping look-up table shown in FIG. 5 and the initial target location.

Figure 7:
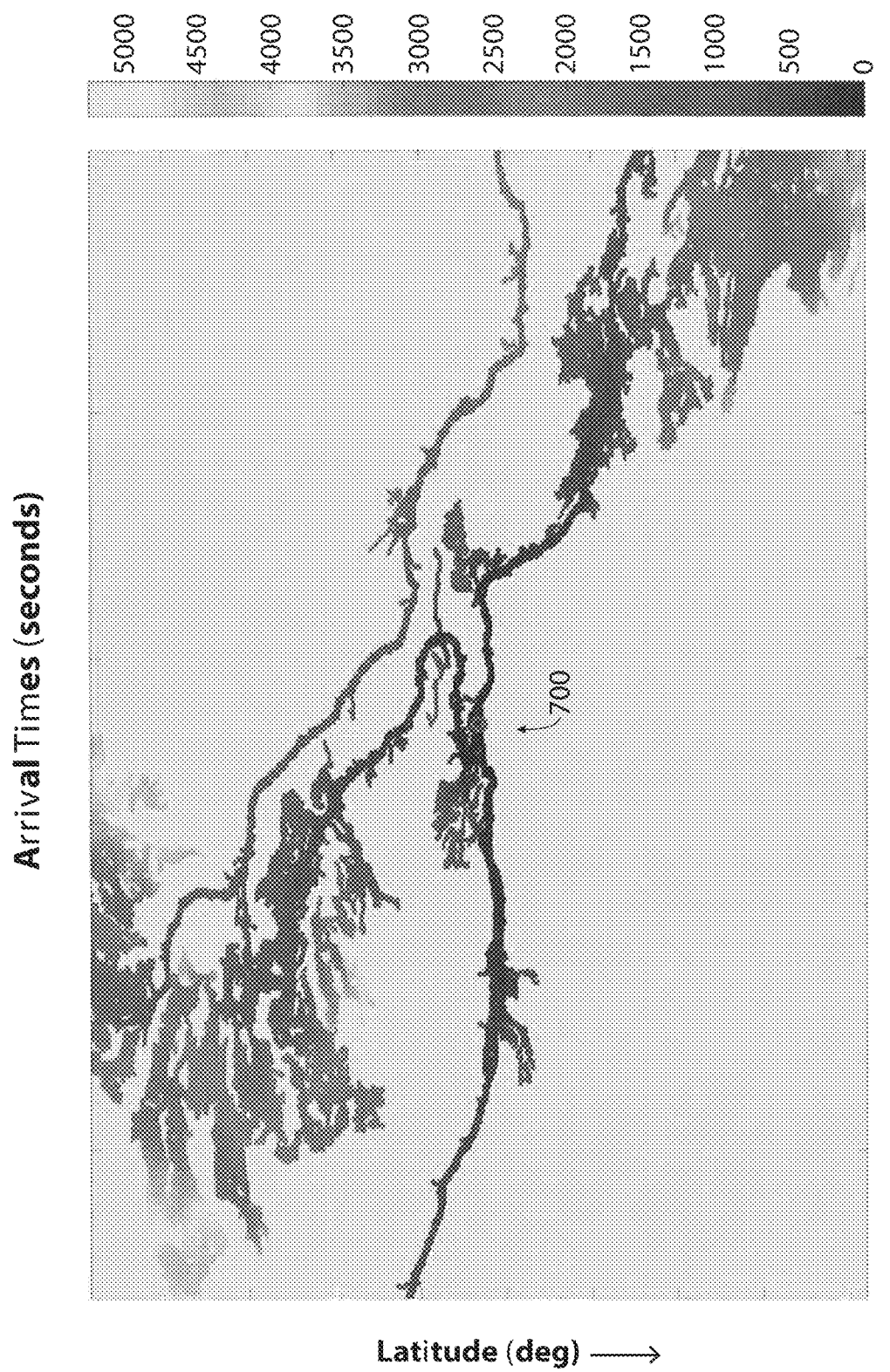
FIG. 7 is a view of the trafficability map of FIG. 6, showing the minimum arrival time at each cell location of the map.
Figure 8:
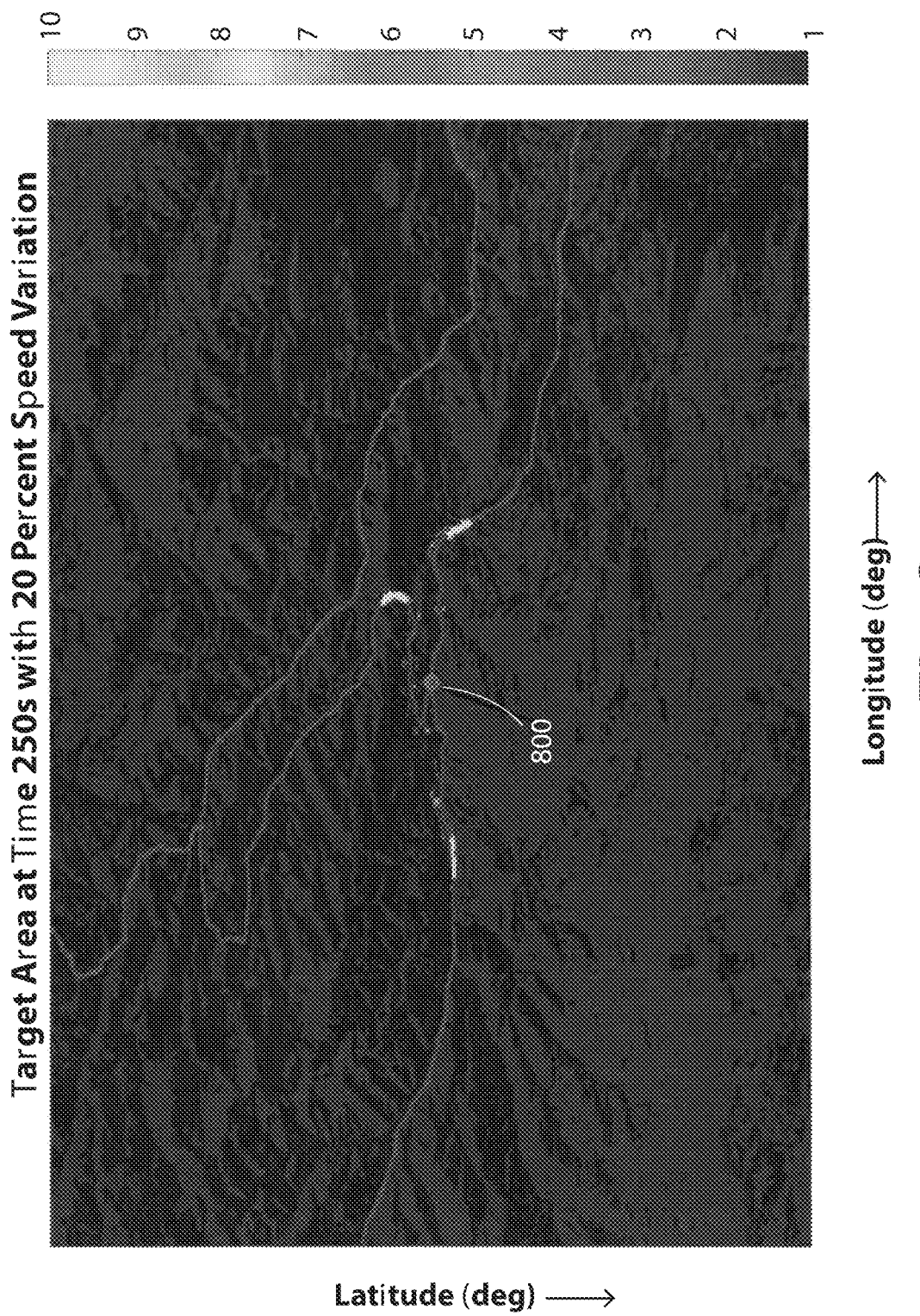
FIGS. 8-15 are views of the trafficability map of FIG. 6, showing the modeled predictions of most probable target location at successive time intervals after the initial time.
Figure 9:
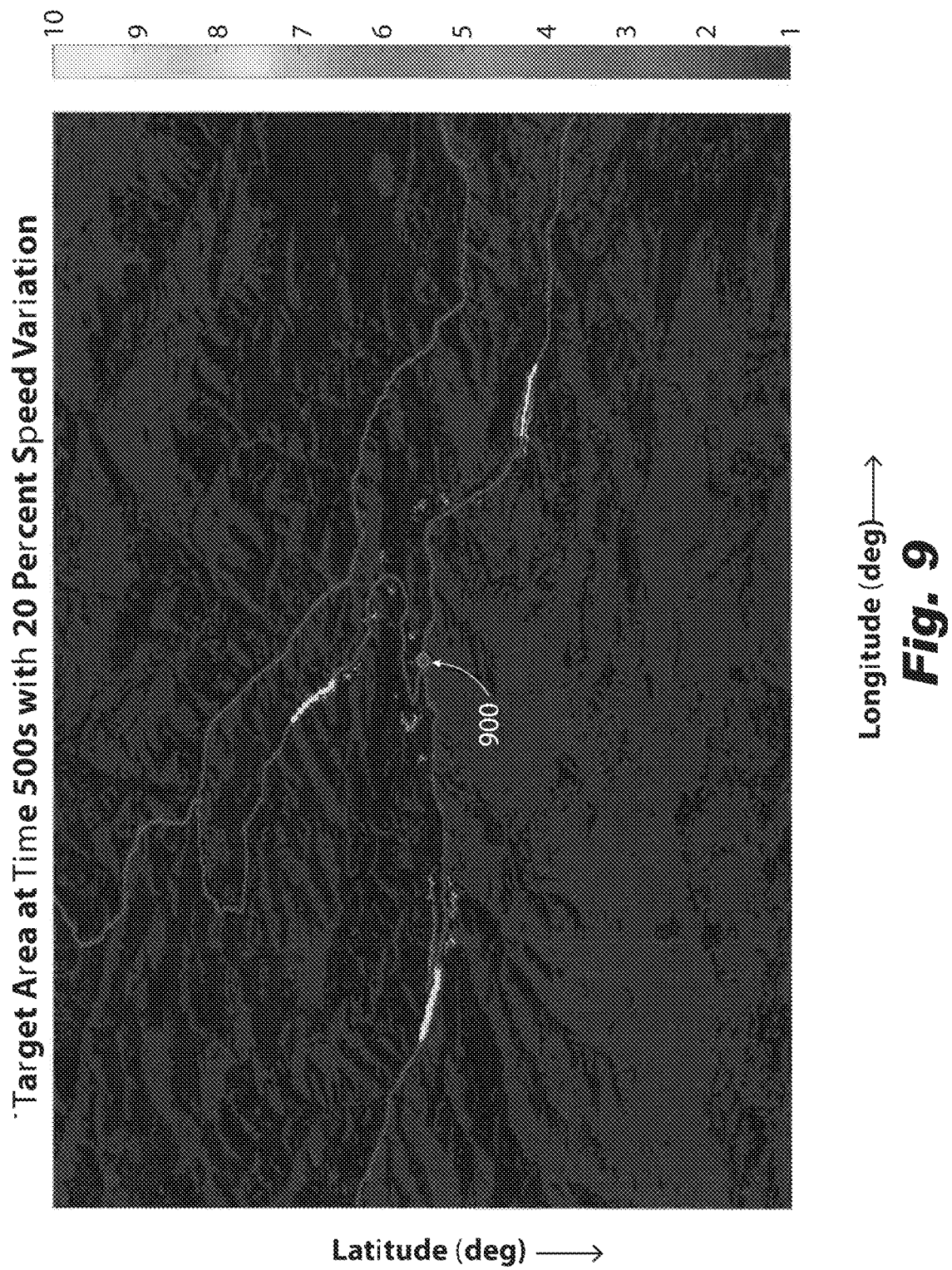
Figure 10:
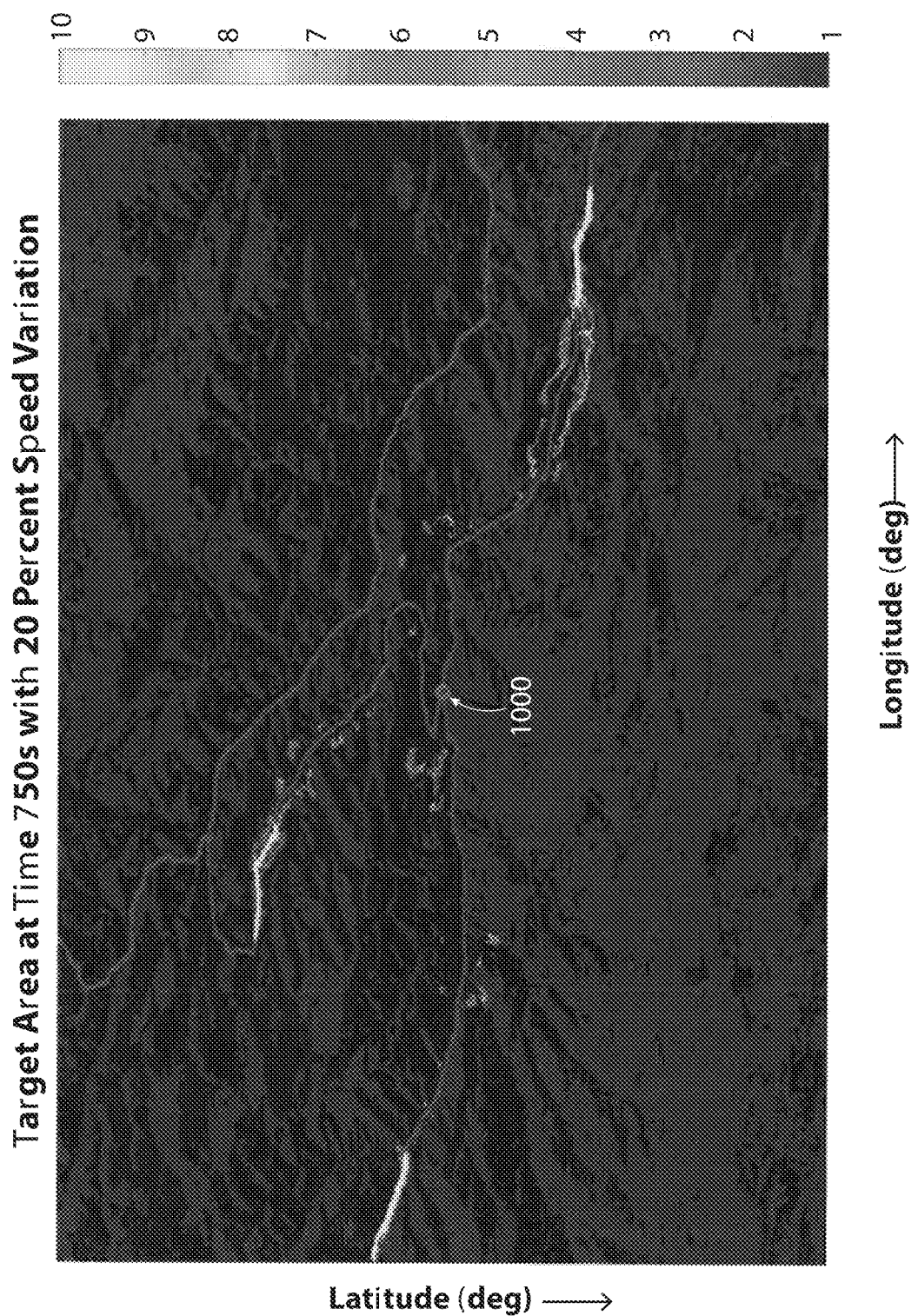
Figure 11:
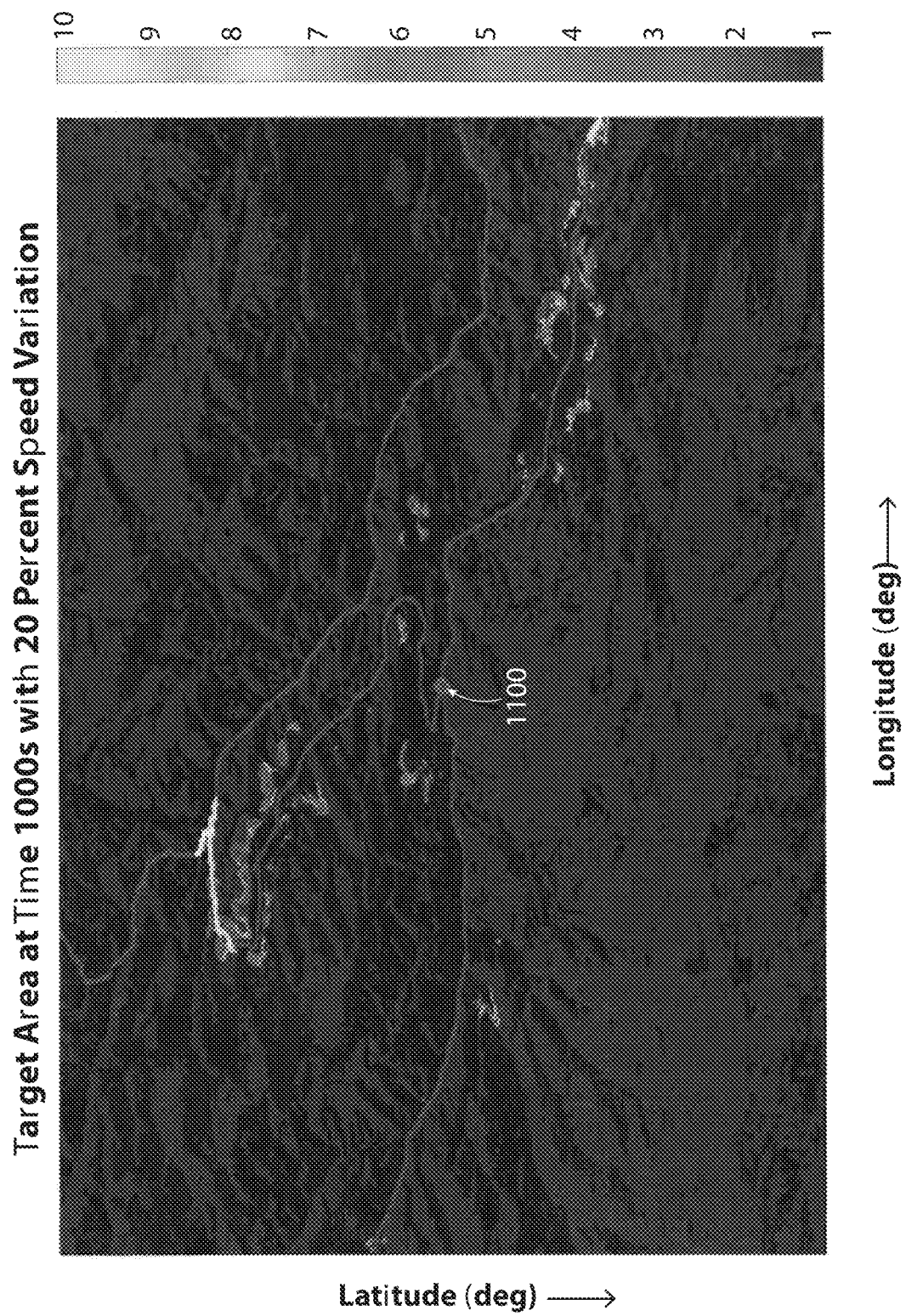
Figure 12:
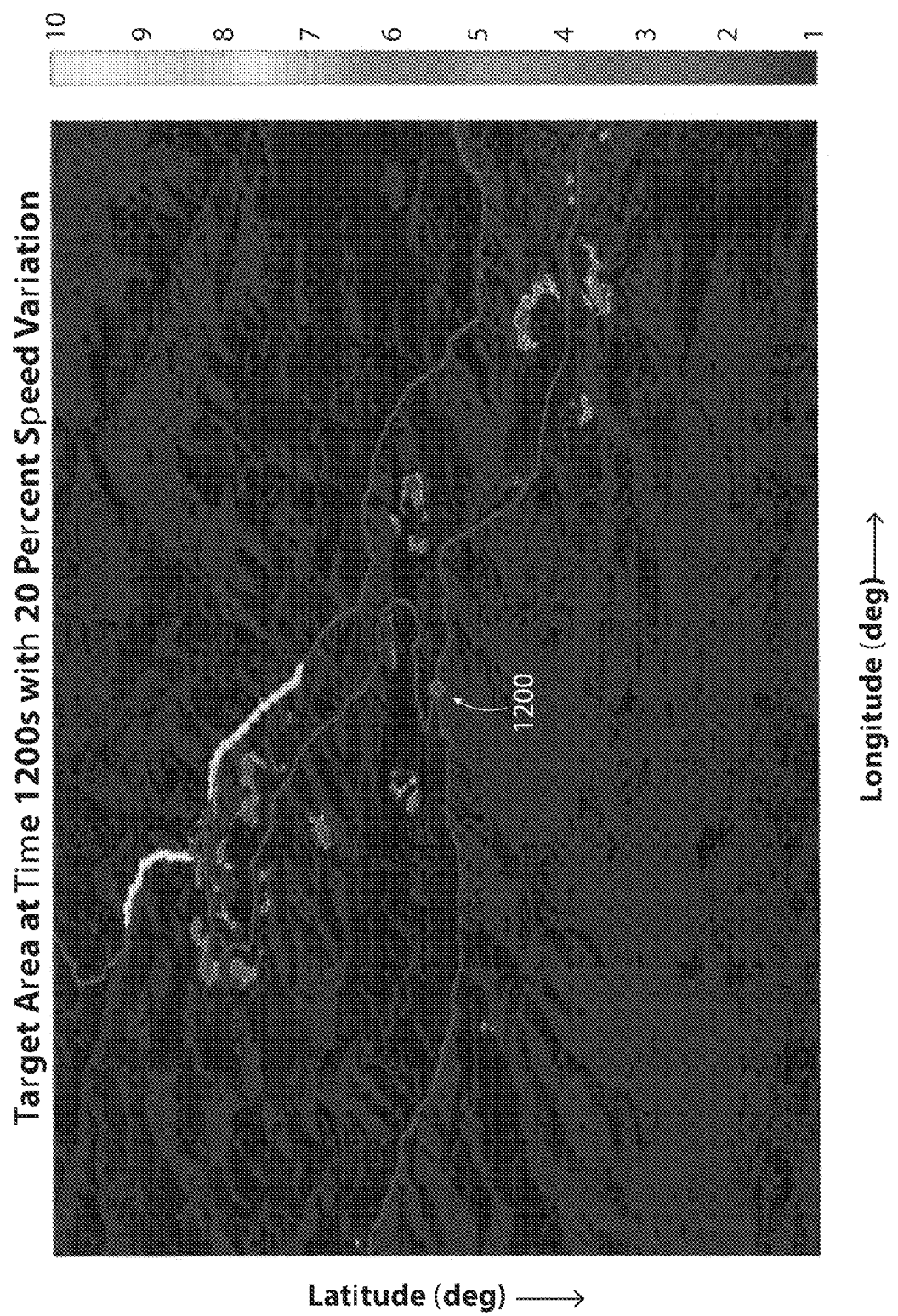
Figure 13:
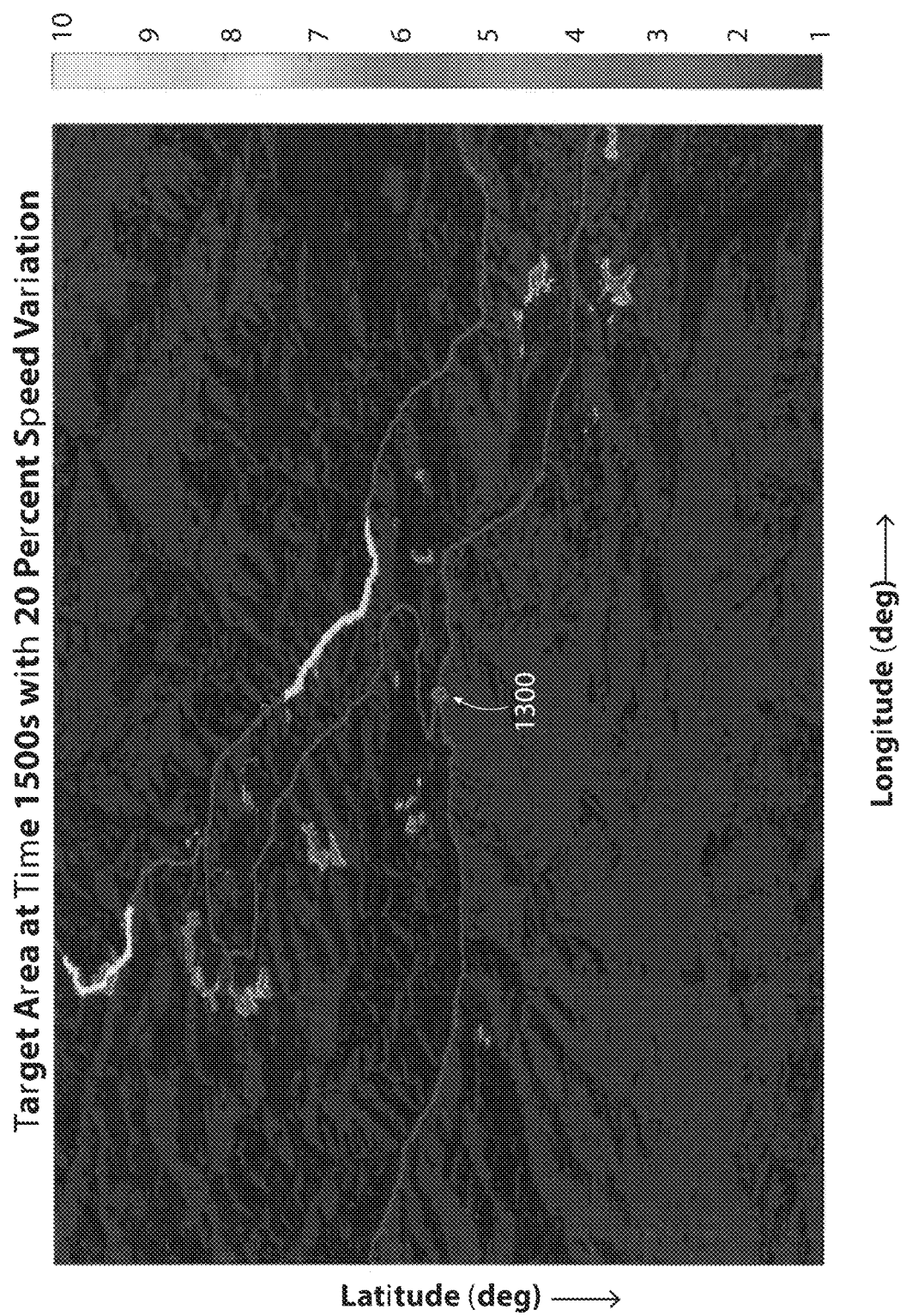
Figure 14:
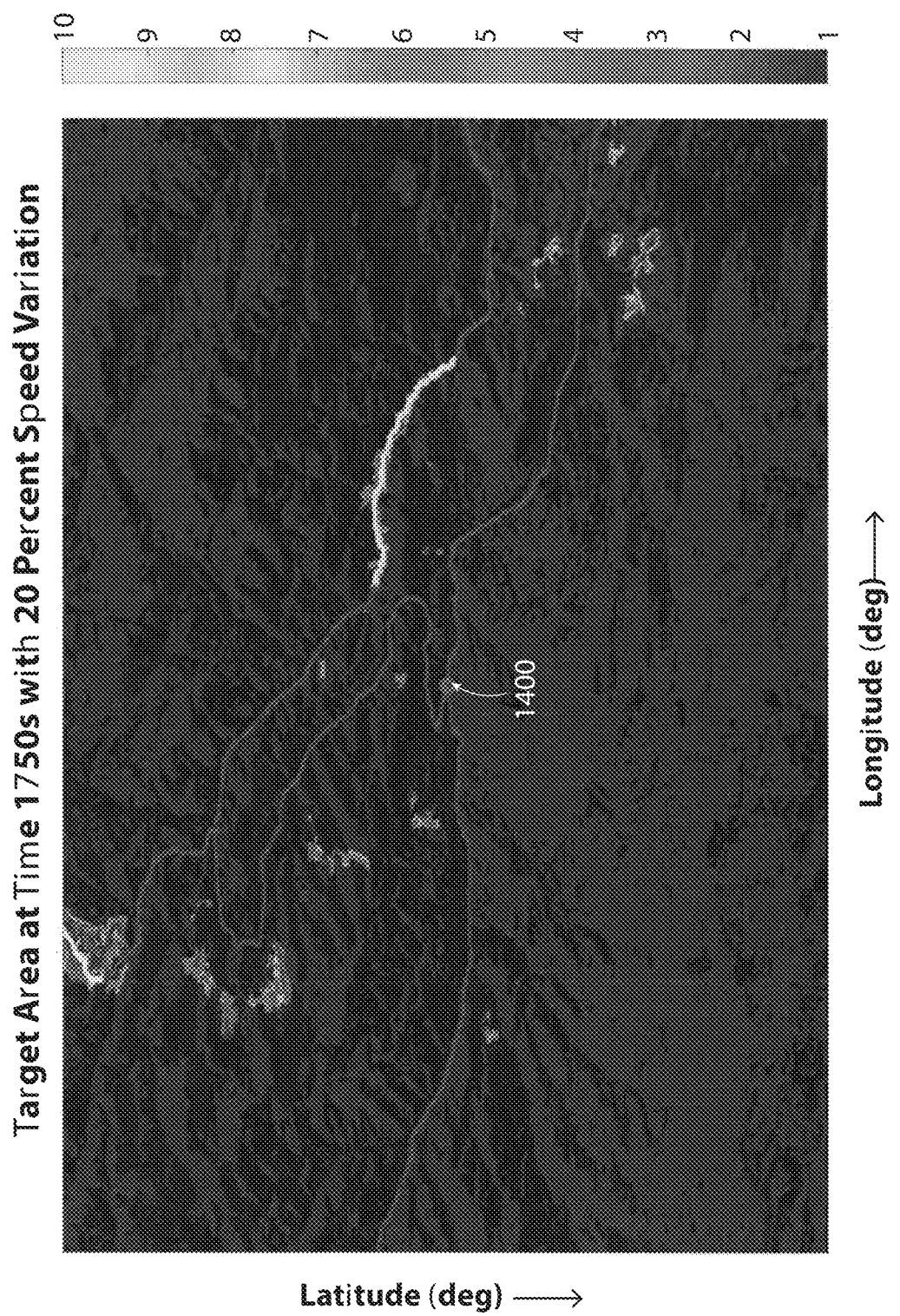
Figure 15:
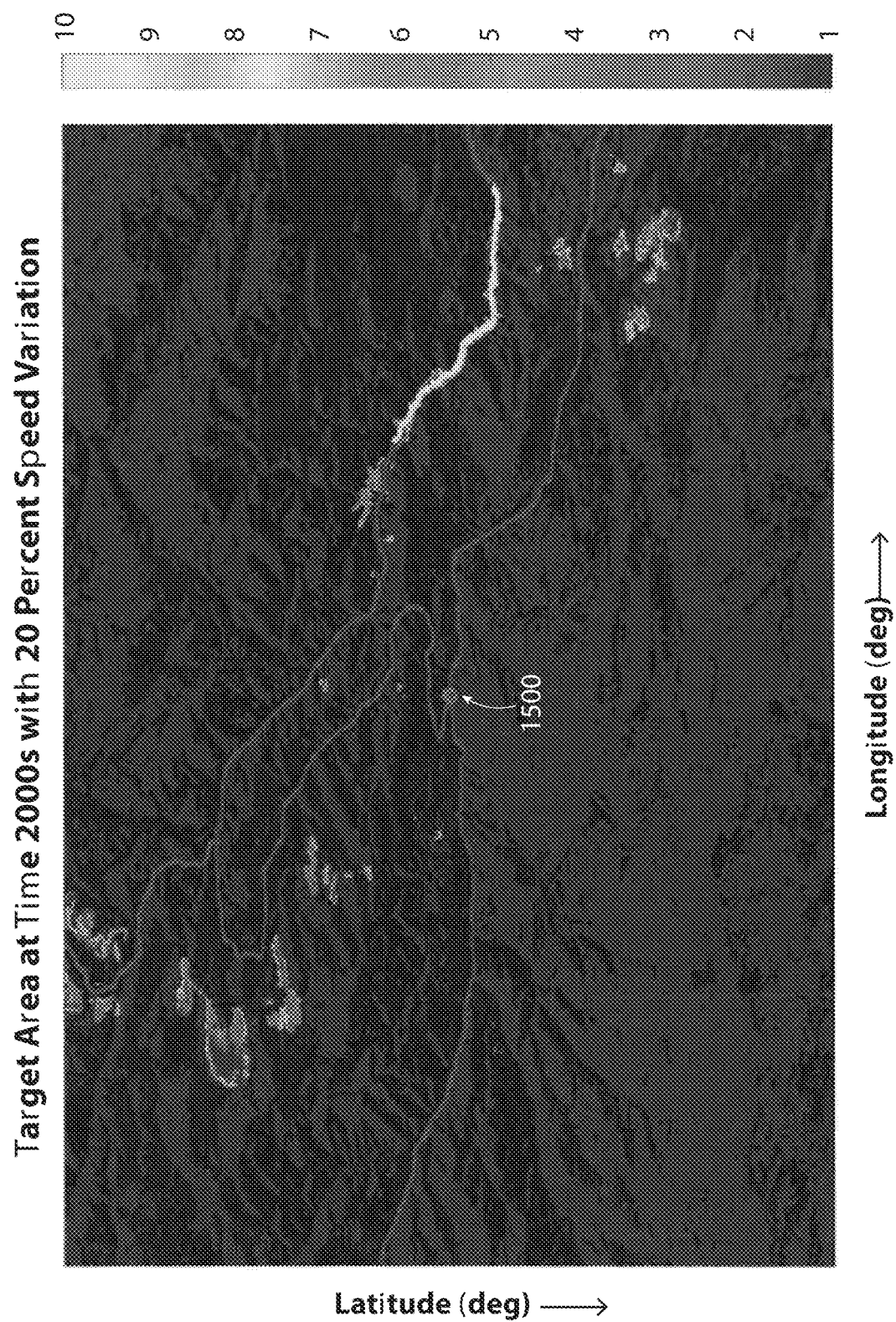

FIG. 7 shows the result of the minimum arrival time computation at each location of the trafficability map shown in FIG. 6 with the starting target location 700. The minimum arrival time in seconds is color-coded with the scale shown on the right of the figure. Areas of the map that were inaccessible by the targets given the starting location 600 (also called no-go areas) have an arrival time of infinity, a value that cannot be displayed on the map. Instead, the color at the top of the color scale is chosen for the no-go areas as well. As seen from the figure, the minimum arrival time is zero at the starting location 700 and monotonically increases as one moves away from the starting location. The road network on the trafficability map provides a fast conduit for the target to traverse the map. This network has an arrival time that is at the low end of the color scale. As one moves to the off-road regions of the map, the minimum arrival time quickly rises as the target is traveling slower in these regions and the time increases proportionally to the difficulty of the terrain as well as the distance from the nearest paved surface.

The next set of FIGS. 8-15 visually show the areas one is likely to find the target after a certain time has elapsed after the initial time t=0. In each of the figures, the traffic ability map is shown in muted colors using the same color-coded scale as in FIG. 6 except for the areas that have a non-zero probability of finding the target at a particular time t>0. These areas are computed by finding the set $A_r = \{r: s_{vl}t \leq t_r^m \leq s_{vu}t\}$ and are displayed with a see through mask that makes the original colors visible. The target speed variation is assumed to be 20% in these figures with $s_{vl}=0.8$ and $s_{vu}=1.0$. The minimum arrival time $t_r^m$ at each cell location r is computed using the iterative algorithm outlined above and shown in FIG. 7. The initial target location is shown by a red circle in the center of the map in each of the figures. The area of non-zero probability is displayed at different times starting from t=250 secs to t=2000 secs in increments of 250 seconds in the FIGS. 8 to 15 respectively.

There are a few interesting observations that can be made from this example. First, note that the initial target is located where three roads meet. Since the direction of travel of the target is not known in this particular example, the target is equally likely to go on each of these roads. This is visible clearly when the prediction is made for t=250 sec in FIG. 8; here we see that the target has travelled in three different directions from the initial red circle with the area it could be found in highlighted in yellow along the three roads. Second, the target moves away fastest from the initial location along the roads shown as highlighted yellow regions and more slowly along the flat- and shallow-grade non-paved surfaces adjacent to the roads shown as highlighted blue areas. This is best observed by viewing the FIGS. 8-15 in sequence to generate an animation. Finally, as the time t becomes large, our knowledge of the exact location of the target becomes fuzzier. This manifests itself as the large uncertainties in the precise location of the target as the time becomes larger and can be seen by the area of non-zero probability growing in time starting from FIG. 8 and increasing monotonically for the subsequent FIGS. 9-15.

Figure 16:
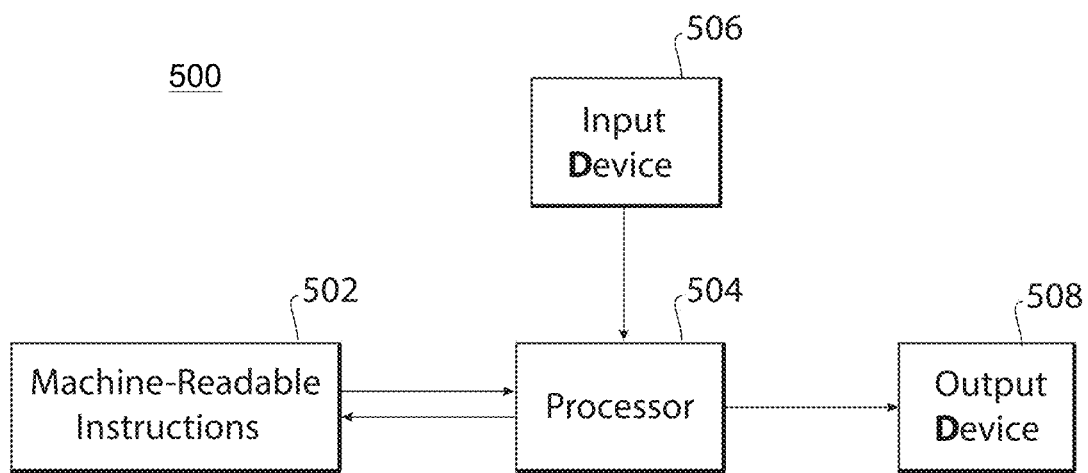
FIG. 16 is a schematic view of a system constructed in accordance with the present invention.

With reference now to FIG. 16, a system 500 includes machine readable instructions 502, e.g. memory or other storage, for performing any of the methods described above. A processor 504 is operatively connected to the machine readable instructions 502 and is configured to perform any of the methods described above. An input device 506 is operatively connected to the processor 504 for inputting the user query to the processor 504. An output device 508 is operatively connected to the processor 504 for outputting an answer to the query to the user.

The methods and systems of the present disclosure, as described above and shown in the drawings, provide for predictive target tracking using trafficability maps. While the apparatus and methods of the subject disclosure have been shown and described with reference to preferred embodiments, those skilled in the art will readily appreciate that changes and/or modifications may be made thereto without departing from the scope of the subject disclosure.

What is claimed is:
1. A method comprising:
receiving a query from a user requesting a prediction on future location of a target at a time t>0;
receiving a trafficability map wherein the target is located in the trafficability map at an initial time t=0;

receiving information about the target including uncertainty on speed of the target;

modeling motion of the target using information from the trafficability map including terrain and target mobility on different terrain types to locations on the trafficability map; and answering the query from the user based on output from modeling motion of the target, wherein modeling motion includes using a Monte Carlo modeling scheme wherein a plurality of sample targets are introduced on the trafficability map each endowed with motion characteristics of the target and propagated over time with different speeds and direction of travel drawn from uncertainty distributions based on terrain and target characteristics.

2. The method as recited in claim 1, wherein answering the query from the user includes answering based on the distribution of the plurality of sample targets.

3. A method comprising:

receiving a query from a user requesting a prediction on future location of a target at a time t>0;

receiving a trafficability map wherein the target is located in the trafficability map at an initial time t=0;

receiving information about the target including uncertainty on speed of the target;

modeling motion of the target using information from the trafficability map including terrain and target mobility on different terrain types to locations on the trafficability map; and answering the query from the user based on output from modeling motion of the target, wherein modeling motion of the target includes computing a minimum arrival time based on terrain and target motion characteristics on different terrain types using an iterative scheme where approximate arrival times of the target are progressively refined to approach a final predicted minimum arrival time.

4. The method as recited in claim 3, further comprising using the final predicted minimum arrival time and the uncertainty on speed of the target to compute upper and lower bounds for a respective arrival time at each location on the trafficability map.

5. The method as recited in claim 4, further comprising using the upper bound and lower bound on the arrival time to answer the query from the user.

6. The method as recited in claim 4, wherein computing upper and lower bounds includes:

letting $s_v$, where $0 \leq s_v \leq 1$, denote a model scale factor applied to maximum speed of the target assuming all different speed variations over time average out and manifest as a simple scaling of maximum vehicle speed on each terrain type;

modeling uncertainty by making $s_v$ a random variable and establishing upper and lower bounds on $s_v$ from a user supplied confidence interval; and computing the bounds on the arrival time using the bounds on $s_v$.

7. The method as recited in claim 6, wherein the bounds on the arrival time are computed as $[t_r^m/s_{vu}, t_r^m/s_{vl}]$, where $s_{vl}, s_{vu}$, denote user supplied bounds on $s_v$ and $t_r^m$ denotes the computed minimum arrival time for each cell location r.

8. The method as recited in claim 4, wherein the query includes a request for at least one of:

a range of arrival times at a given cell location on the trafficability map;

a target location at different times;

an area in which the target can be found at a specified time; and/or probability of finding the target in a set of cell locations at a specified time.

9. The method as recited in claim 3, further comprising:

receiving location and uncertainty of location for a detected target at the time t>0, wherein modeling motion of the target includes generating a probability mass of location of the target at the t>0;

determining from the location and uncertainty of location for the detected target and from the probability mass of the target whether the target corresponds to the detected target at the time t>0; and reinitializing the trafficability map if the target corresponds to the detected target to continue modeling motion of the target from the location of the at detected target, including resetting the initial time to the time t>0.

10. The method as recited in claim 9, further comprising informing the user that the detected target is the same as the target in the query.

11. A method comprising:

receiving a query from a user requesting a prediction on future location of a target at a time t>0;

receiving a trafficability map wherein the target is located in the trafficability map at an initial time t=0;

receiving information about the target including uncertainty on speed of the target;

modeling motion of the target using information from the trafficability map including terrain and target mobility on different terrain types to locations on the trafficability map;

answering the query from the user based on output from modeling motion of the target;

receiving a new detection including a location uncertainty map of the new detection at a time $t_1$>0;

wherein modeling motion includes predicting a location uncertainty map of the target location at the time $t_1$;

computing a fused probability mass of the location uncertainty map of the target and the location uncertainty map of the new detection;

determining the new detection is a new target if the fused probability mass is zero; and determining the new detection is the target if the fused probability mass is non-zero.

12. The method as recited in claim 1, further comprising receiving initial direction of travel of the target at the initial time t=0.

13. A method comprising:

receiving a query from a user requesting a prediction on future location of a target at a time t>0;

receiving a trafficability map wherein the target is located in the trafficability map at an initial time t=0;

receiving information about the target including uncertainty on speed of the target;

modeling motion of the target using information from the trafficability map including terrain and target mobility on different terrain types to locations on the trafficability map;

answering the query from the user based on output from modeling motion of the target, receiving initial direction of travel of the target at the initial time t=0; and generating a region of interest (ROI) based on the initial direction of travel, wherein modeling motion of the target is performed only for the ROI on the assumption that the target cannot reach points outside the ROI.

14. A method comprising:
receiving a query from a user requesting a prediction on future location of a target at a time t>0;
receiving a trafficability map wherein the target is located in the trafficability map at an initial time t=0;
receiving information about the target including uncertainty on speed of the target;
modeling motion of the target using information from the trafficability map including terrain and target mobility on different terrain types to locations on the trafficability map;
answering the query from the user based on output from modeling motion of the target,
receiving initial direction of travel of the target at the initial time t=0, wherein modeling motion includes excluding probability masses located in an opposite direction from the initial direction of travel of the target when answering query.

15. A method comprising:
receiving a query from a user requesting a prediction on future location of a target at a time t>0;
receiving a trafficability map wherein the target is located in the trafficability map at an initial time t=0;
receiving information about the target including uncertainly on speed of the target;
modeling motion of the target using information from the trafficability map including terrain and target mobility on different terrain types to locations on the trafficability map;
answering the query from the user based on output from modeling motion of the target; and
receiving a region of interest (ROI) within the trafficability map, wherein modeling motion of the target is performed only for the ROI on the assumption that the target cannot reach points outside the ROI.

16. The method as recited in claim 1, wherein modeling motion of the target is performed for all locations on the trafficability map.

17. The method as recited in claim 1, wherein receiving information about the target includes receiving location of the target, speed of the target, direction of travel of the target, and a label indicative of what the target is classified as.

18. A system comprising:
machine readable instructions for performing the method recited in claim 1;
a processor operatively connected to the machine readable instructions and configured to perform the method recited in claim 1;
an input device operatively connected to the processor for inputting the user query to the processor; and
an output device operatively connected to the processor for outputting an answer to the query to the user.

19. A system comprising:
machine readable instructions for performing the method recited in claim 3;
a processor operatively connected to the machine readable instructions and configured to perform the method recited in claim 3;
an input device operatively connected to the processor for inputting the user query to the processor; and
an output device operatively connected to the processor for outputting an answer to the query to the user.

20. A system comprising:
machine readable instructions for performing the method recited in claim 11;
a processor operatively connected to the machine readable instructions and configured to perform the method recited in claim 11;
an input device operatively connected to the processor for inputting the user query to the processor; and
an output device operatively connected to the processor for outputting an answer to the query to the user.

* * * * *